United States Patent [19]
Nakajima

[11] Patent Number: 5,937,822
[45] Date of Patent: Aug. 17, 1999

[54] CONTROL SYSTEM FOR INTERNAL COMBUSTION ENGINE

[75] Inventor: Yuki Nakajima, Yokohama, Japan

[73] Assignee: Nissan Motor Co., Ltd., Yokohama, Japan

[21] Appl. No.: 09/089,364

[22] Filed: Jun. 3, 1998

[30] Foreign Application Priority Data

Jun. 3, 1997 [JP] Japan ................................. 9-144919

[51] Int. Cl.$^6$ ................................................. F02B 17/00
[52] U.S. Cl. .......................................... 123/295; 123/305
[58] Field of Search ..................................... 123/295, 305

[56] References Cited

U.S. PATENT DOCUMENTS

| | | | |
|---|---|---|---|
| 4,955,339 | 9/1990 | Sasaki et al. | 123/295 |
| 5,191,531 | 3/1993 | Kurosu et al. | 123/295 |
| 5,333,583 | 8/1994 | Matsuura | 123/305 |
| 5,732,675 | 3/1998 | Yoshida et al. | 123/305 |
| 5,789,367 | 8/1998 | Lida et al. | 123/305 |

FOREIGN PATENT DOCUMENTS

59-37236  2/1984  Japan .
63-138118  6/1988  Japan .

Primary Examiner—John Kwon
Attorney, Agent, or Firm—Foley & Lardner

[57] ABSTRACT

An engine control system for an internal combustion engine of a type changing a fuel injection timing between a first injection timing to achieve homogeneous charge combustion and a second injection timing to achieve stratified charge combustion comprises at least one sensor and a controller for controlling fuel injection timing and quantity. The controller selects one of homogenous combustion mode and stratified combustion mode in accordance with the engine operating condition sensed by the sensor, calculates the fuel injection quantity for the selected combustion mode, and enables a start of a homogeneous mode injection of fuel to a given cylinder of the engine at the first injection timing for the homogeneous mode if calculation of the homogeneous mode fuel injection quantity for the given cylinder is finished prior to the first injection timing for the given cylinder. If the calculation of the fuel injection quantity for the given cylinder is not finished yet, the control system performs a stratified mode injection of the fuel to the given cylinder at the second injection timing.

18 Claims, 9 Drawing Sheets

CONTROL SYSTEM FOR INTERNAL COMBUSTION ENGINE

The contents of a Japanese Patent Application No. 9-144919 with a filing date of Jun. 3, 1997 in Japan are hereby incorporated by reference.

BACKGROUND OF THE INVENTION

The present invention relates to a control system for an internal combustion engine, and more specifically to a control system for controlling a fuel injection of an engine of a type having a stratified charge combustion mode and a homogeneous charge combustion mode.

Recently, the technique of in-cylinder direct fuel injection in a spark ignition engine such as gasoline engine is under development to improve the fuel efficiency and emission performance by using stratified charge combustion and homogeneous charge combustion.

In low and medium load regions, a control system for such a type operates an engine in a stratified combustion mode by injecting fuel directly into a combustion chamber during the compression stroke so as to produce a stratified combustible mixture only around the spark plug. The thus-achieved stratified combustion enables stable combustion with an ultra lean mixture, and hence significant improvement in the fuel efficiency and emission performance of the engine.

In a high load region over a predetermined engine load, the engine is operated in a homogeneous combustion mode to meet a demand for higher output torque. In the homogeneous combustion mode, fuel is injected during the intake stroke so as to produce a homogeneous air fuel mixture. (In some examples, a fuel injection valve for the homogeneous mode is provided separately in an intake port.)

The control system changes over the combustion mode between the homogeneous mode and the stratified mode in accordance with one or more engine operating conditions.

In an engine of such a type, a wide difference of the fuel injection timing between the homogeneous mode and the stratified mode causes difficulties. When, for example, a changeover command signal for commanding a changeover from the stratified mode to the homogeneous mode is generated between the homogeneous mode fuel injection timing and the stratified mode fuel injection timing for a certain cylinder of the engine, the control system tends to carry out the fuel injection twice in one cycle, first at the homogeneous mode fuel injection timing and then at the stratified mode injection timing. Such double fuel injection makes the air fuel mixture over-rich. In the case of changeover from the stratified mode to the homogeneous mode, the control system tends to miss the homogeneous mode injection timing and then inhibit the fuel injection at the stratified mode injection timing by responding to the changeover to the homogeneous mode. The failure of fuel injection makes over-lean the air fuel ratio averaged over the cylinders of the engine, and causes misfire or poor combustion.

An engine control system may be arranged to change a fuel injection mode in accordance with a selected combustion mode and a fuel injection timing. However, this control system cannot inject fuel adequately in some cases when the fuel injection timing is reached during a time interval between a judgement for changeover of the combustion mode and an end of calculation of a fuel injection quantity (fuel injection pulse width). In general, the judgement on changeover of the combustion mode and the calculation of fuel injection quantity are carried out in synchronism with time, whereas the counting to determine the fuel injection timing is synchronous with the crank angle. A priority is assigned to the crank-angle-synchronous operation. Therefore, the control system is unable to perform the fuel injection properly according to the request if the time has come for the injection during the process of calculation of the fuel injection quantity.

SUMMARY OF THE INVENTION

It is an object of the present invention to provide an engine control system capable of changing over a combustion mode smoothly and adequately.

According to the present invention, an engine control system comprises an internal combustion engine, at least one sensor and at least one controller.

The internal combustion engine comprises a fuel injection system for changing a fuel injection timing between a first injection timing to achieve homogeneous charge combustion and a second injection timing to achieve stratified charge combustion.

The sensor senses at least one engine operating condition of the engine.

The controller is for selecting, as a desired target combustion mode, one of homogenous combustion mode and stratified combustion mode in accordance with the engine operating condition, for calculating a first fuel injection quantity (CTIH) for the homogeneous mode if the homogeneous mode is selected, and a second fuel injection quantity (CTIS) for the stratified mode if the stratified mode is selected, for allowing a start of a homogeneous mode injection of fuel in the first injection quantity to a given cylinder of the engine at the first injection timing for the homogeneous mode if calculation of the first fuel injection quantity for the given cylinder is finished prior to the first injection timing for the given cylinder, and for performing a fuel injection to the given cylinder posterior to the first injection timing if the calculation of the first fuel injection quantity for the given cylinder is not finished before the first injection timing for the given cylinder.

The controller may comprises a selecting means for selecting, as the desired target combustion mode, one of homogenous combustion mode and stratified combustion mode in accordance with the engine operating condition, a calculating means for calculating the first fuel injection quantity (CTIH) for the homogeneous mode if the homogeneous mode is selected, and the second fuel injection quantity (CTIS) for the stratified mode if the stratified mode is selected, and a controlling means for allowing the start of the homogeneous mode injection of fuel in the first injection quantity to a given cylinder of the engine at the first injection timing for the homogeneous mode if the calculation of the first fuel injection quantity for the given cylinder is finished prior to the first injection timing for the given cylinder, and for performing a stratified mode fuel injection of the fuel in the second injection quantity to the given cylinder at the second injection timing if the calculation of the first fuel injection quantity for the given cylinder is not finished before the first injection timing for the given cylinder.

DETAILED DESCRIPTION OF THE INVENTION

Figure 1:
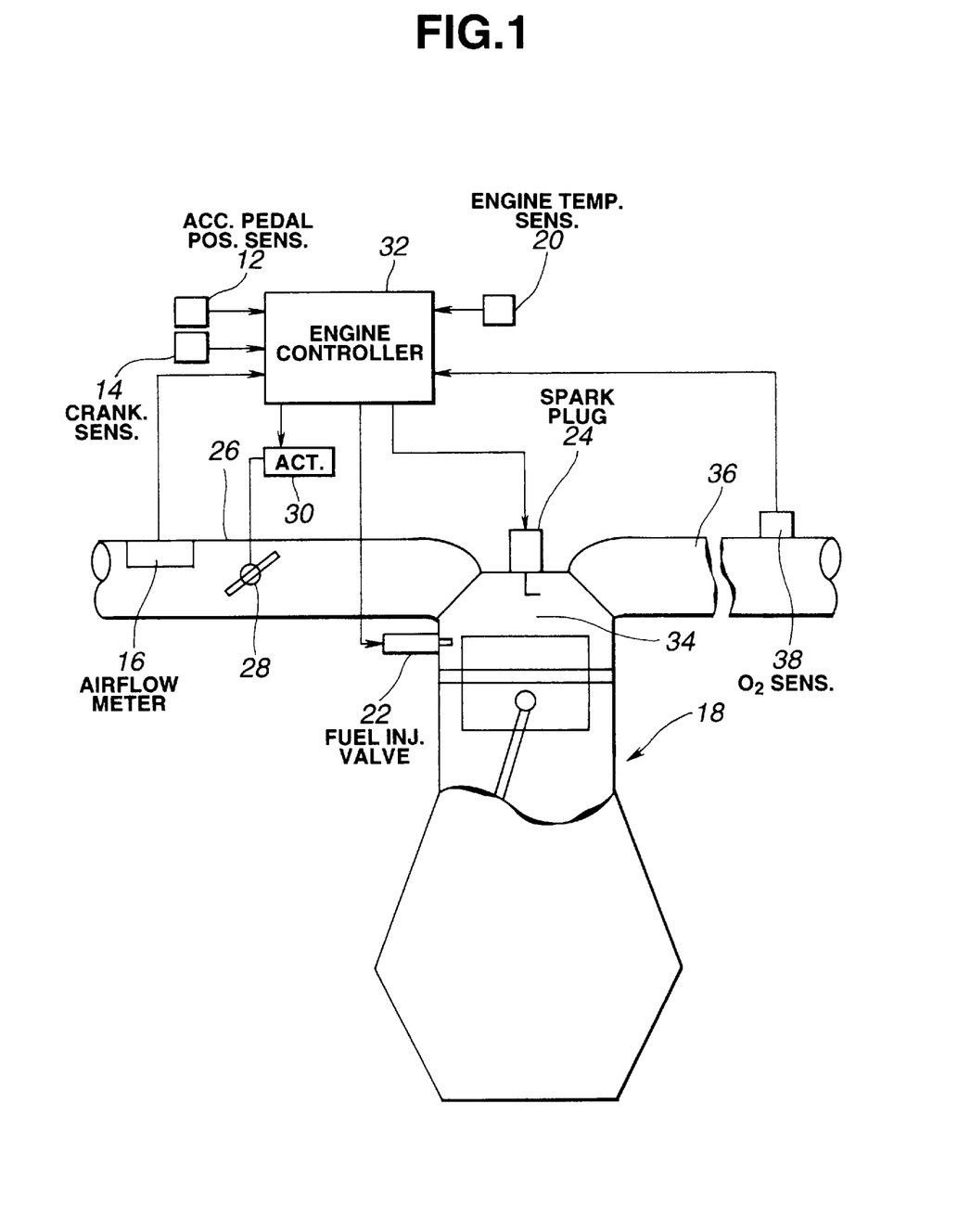
FIG. 1 is a schematic view showing an engine control system according to one embodiment of the present invention.

FIG. 1 shows an engine control system according to one embodiment of the present invention.

The engine control system comprises an input section including a group of sensors, a control section and an output section including devices serving as actuators of the control system.

The input section of this example comprises an accelerator position sensor 12 for sensing a position of an accelerating system of an internal combustion engine 18, a crank angle sensor 14, an air flow meter (or air flow sensor) 16 for sensing an intake air quantity for the engine 18, and an engine temperature sensor 20 for sensing the temperature of an engine cooling water. The accelerator sensor 1 of this example senses an opening degree (or a depression degree) of an accelerator pedal of the vehicle. The crank angle sensor 2 of this example produces a position signal signaling each unit crank angle, and a reference signal signaling each cylinder stroke phase difference. The control system can sense the engine speed Ne by measuring the number of position signals per unit time, or measuring the period of occurrence of reference signals.

The engine 18 comprises a fuel injector 22 and a spark plug 24 for each cylinder. The fuel injector 22 of each cylinder injects fuel directly into the combustion chamber 34 of the cylinder of the engine 18 in response to a fuel injection control signal, and the spark plug 24 initiates ignition in the combustion chamber 34. The fuel injection system of this engine 18 is arranged to operate the fuel injectors 6 in one of a stratified combustion mode and a homogeneous combustion mode. In low and medium load engine operating regions, the fuel injector 22 of each cylinder injects the fuel into the combustion chamber 34 in the compression stroke to form stratified combustible mixture closely around spark plug 24 and thereby achieve stratified combustion with a very lean air fuel mixture. In a high engine load region, the fuel injector 6 of each cylinder is controlled in the homogeneous combustion mode, and injects fuel into the combustion chamber 34 in the intake stroke to form homogenous mixture over the entirety of the cylinder and thereby achieve homogeneous combustion to provide more power output. The fuel injectors 6 serve as an actuator (or part of an actuator) for controlling the combustion condition in the engine 18.

A throttle valve 28 is disposed in an intake air passage 26 of the engine 18. A throttle actuator (or throttle control unit) 30 is arranged to electronically control the opening degree of the throttle valve 28. The throttle valve 28 serves as an intake air metering device for controlling a fresh intake air quantity to the engine 18.

An engine controller (or control unit) 32 receives signals from the input section to collect input information on engine operating conditions, and controls the opening degree of the throttle valve 28 through the throttle actuator 30, the fuel injection quantity (or fuel supply quantity) and fuel injection timing of each fuel injector 22 and the ignition timing of each spark plug 24 in accordance with the engine operating conditions.

The engine controller 32 is a main component in the control section of the control system. For example, the controller 32 includes at least one computer including at least a central processing unit (CPU) and a memory section having ROM and RAM.

The input section of this example further includes an air fuel ratio sensor 38 provided in an exhaust passage 36 of the engine, for sensing the air fuel ratio of the air fuel mixture by sensing a concentration of a predetermined component such as oxygen in the exhaust gas mixture.

FIGS. 2, 3, 4, 6, 8, 9 and 10 show a fuel injection control process performed by the engine controller 32.

Figure 2:
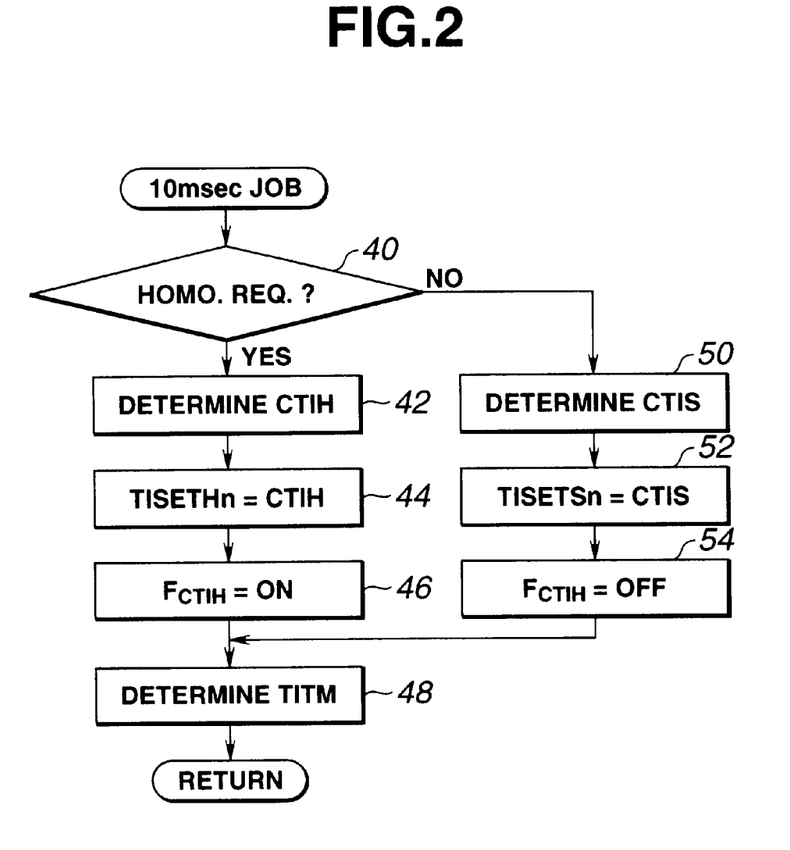
FIG. 2 is a flowchart showing a routine for the control system of FIG. 1 to calculate a fuel injection quantity.

FIG. 2 shows a control flow for calculation of fuel injection quantity. The controller 32 performs the flow of FIG. 2 at regular time intervals of a predetermined time length. For example, the control flow of FIG. 2 is performed every 10 msec.

At a step 40, the controller 32 checks whether there exists a request for the homogeneous combustion. The step 40 corresponds to a selecting means or a selecting step for selecting one of the homogeneous combustion mode and the stratified combustion mode. In this example, the controller 32 first determines a desired combustion mode (the homogeneous mode or the stratified mode) in accordance with engine operating conditions such as engine speed and engine load. The controller 32 of this example uses the engine speed and the engine load as basic parameters for determining the desired combustion mode, and further uses one or more other engine operating conditions such as the engine cooling water temperature, as secondary parameter. Furthermore, the controller 32 determines a target equivalent ratio in accordance with the engine operating conditions and the desired combustion mode, for example, by information retrieval from a predetermined map. When the target equivalent ratio is changed in a stepwise manner in response to a change in the engine operating condition requiring a changeover of the combustion mode, it is not possible to change the actual equivalent ratio for the engine immediately because of a lag in change of the intake air quantity due to a lag in movement of the throttle valve 28 and a lag attributable to the volume of the intake system. Therefore, the control system of this example determines a phase delay corrected target equivalent ratio by subjecting a change of the equivalent ratio to a phase-delay correction so as to keep pace with the lagging change of the intake air quantity, and varies the engine output torque smoothly by using the delay corrected equivalent ratio. Furthermore, the control system of this example allows a changeover of the combustion mode when the delay corrected target equivalent ratio is in a predetermined (overlap) region, to ensure a stable combustion both before and after the changeover of the combustion mode. In this region, the desired equivalent ratio for the homogeneous mode and the desired equivalent ratio for the stratified mode overlap each other. In this example, the control system selects one of the homogeneous combustion mode and the stratified combustion mode, by comparing the delay corrected equivalent ratio with a predetermined threshold defining a region suitable for the changeover of the combustion mode. For example, the control system selects the homogeneous mode when the delay corrected equivalent ratio is higher than or equal to the threshold, and the stratified combustion mode when the delay corrected equivalent ratio is lower than the threshold. For example, the engine controller 32 produces a select signal in a signal state (corresponding to the affirmative answer YES of the step 40) to select the homogeneous mode when an engine operating parameter indicative of the engine load is varied from a region (such as a low or medium load region) requiring the stratified combustion mode, to a region (such as a high load region) requiring the homogeneous combustion mode, and the delay corrected equivalent ratio enters a predetermined region allowing a changeover from the stratified mode to the homogeneous mode.

When the homogeneous combustion is selected at the step 40, the controller 32 proceeds to a step 42, and calculates a fuel injection quantity CTIH according to the homogeneous combustion mode. In this example, the homogeneous mode fuel injection quantity CTIH is calculated in the following manner. First, from the engine speed Ne and the actual intake air quantity Q sensed by the air flow meter 16, the controller 32 calculates a basic fuel injection quantity Tp (Tp=k·Q/Ne; k is a constant.). In this example, the fuel injection quantity Tp is in terms of a reference equivalent ratio {normally, a value (=1) corresponding to the theoretical air fuel ratio}. The basic injection quantity Tp is then modified by the above-mentioned phase delay corrected target equivalent ratio TFBYAD, a correction coefficient THOS determined from an engine operating condition such as the water temperature, a combustion efficiency factor (or combustion efficiency correction coefficient) ITAF, and a battery voltage correction quantity Ts, according to the following equation.

$$CTIH=Tp \cdot TFBYAD \cdot THOS \cdot ITAFH+Ts$$

In this equation, the combustion efficiency factor ITAF is set equal to a homogeneous mode combustion efficiency factor ITFAH. The combustion efficiency is variable in dependence on the target equivalent ratio and an EGR rate (exhaust gas recirculation rate). Furthermore, the combustion efficiency is affected by the combustion mode. In the region of the equivalent ratio in which a changeover of the combustion mode is possible with deteriorating the stability of combustion, the combustion efficiency is higher in the homogeneous mode than in the stratified mode. Therefore, the controller 32 determines the combustion efficiency factor ITAF in accordance with the target equivalent ratio and an EGR rate, as parameters, by using one of a map for the homogeneous mode and a map for the stratified mode. At the step 42, the controller 32 determines the homogeneous mode combustion efficiency factor ITFAH by using the map of the homogeneous mode and uses it for determining CTIH. Thus, the combustion efficiency is different between the homogeneous combustion and the stratified combustion, and the control system must calculate the fuel injection quantity for each of the combustion modes separately from the other. The control system according to this embodiment of the present invention is arranged to calculate only the fuel injection quantity of the selected combustion mode. This arrangement can reduce the load of calculation (or computation), as compared to the conventional system arranged to always calculate both the fuel injection quantity for the homogeneous mode and the fuel injection quantity for the stratified mode.

At a step 44, the controller 32 sets the fuel injection quantity CTIH calculated at the step 42 as a next homogeneous mode fuel injection quantity TISETHn for an engine cylinder n scheduled to receive a next fuel injection.

At a step 46, the controller 32 sets a CTIH calculation end flag FCTIH (first condition signal) to indicate that the calculation of the homogeneous mode fuel injection quantity CTIH is finished.

At a step 48, the controller 32 determines a crank angle (or angular distance) TITM from a reference signal REG from a specified cylinder among signals REF outputted at a predetermined crank angle position of each cylinder, to a fuel injection timing of the cylinder to which the fuel is to be injected next time.

When the stratified combustion is selected and hence there is no request for the homogeneous combustion, the controller 32 proceeds from the step 40 to a step 50. At the step 50, the controller 32 calculates a fuel injection quantity CTIS according to the stratified combustion mode in the same manner as the calculation of the homogeneous mode injection quantity CTIH. In the calculation of CTIS, the controller 32 uses a stratified mode combustion efficiency factor ITAFS determined by the map for the stratified combustion mode, instead of the homogeneous mode efficiency factor ITAFH.

At a step 52, the controller 32 sets the stratified mode fuel injection quantity CTIS, as a stratified mode fuel injection quantity TISETSn for the corresponding cylinder.

At a step 54, the controller 32 resets the CTIH calculation end flag FCTIH to indicate that the calculation of the homogeneous mode fuel injection quantity CTIH is not finished.

Then, the controller 32 proceeds to the step 48, and determines the crank angle TITM to the fuel injection timing of the cylinder to which the fuel is to be injected next time.

Figure 3:
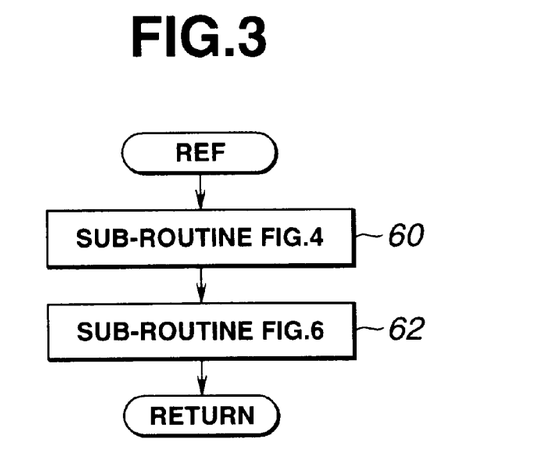
FIG. 3 is a flowchart showing a main routine for the control system of FIG. 1, to set fuel injection timings for a homogeneous combustion mode and a stratified combustion mode.

FIG. 3 shows a basic flow for setting a fuel injection timing (I/T). The controller 32 carries out the flow of FIG. 3 each time the above-mentioned signal REF is inputted. The controller 32 sets the fuel injection timing in the intake stroke for the homogeneous combustion mode at a step 60, and then sets the fuel injection timing in the compression stroke for the stratified combustion mode at a step 62.

Figure 4:
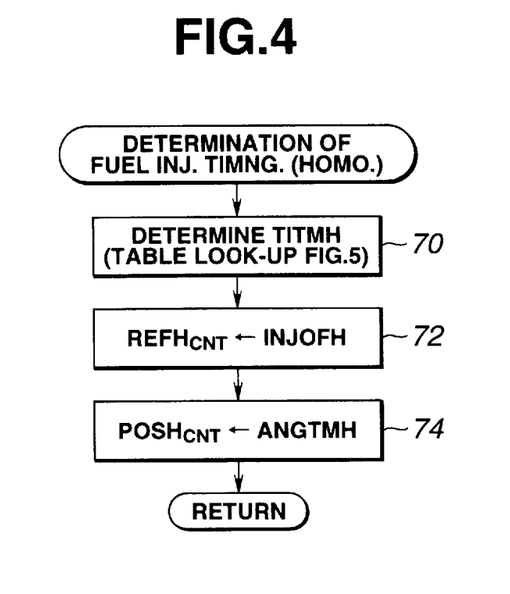
FIG. 4 is a flowchart showing a sub routine for the control system of FIG. 1, to set the fuel injection timing for the homogeneous combustion mode.

FIG. 4 shows a control flow of subroutine (of the step 60) for setting the fuel injection timing for the homogeneous combustion mode.

Figure 5:
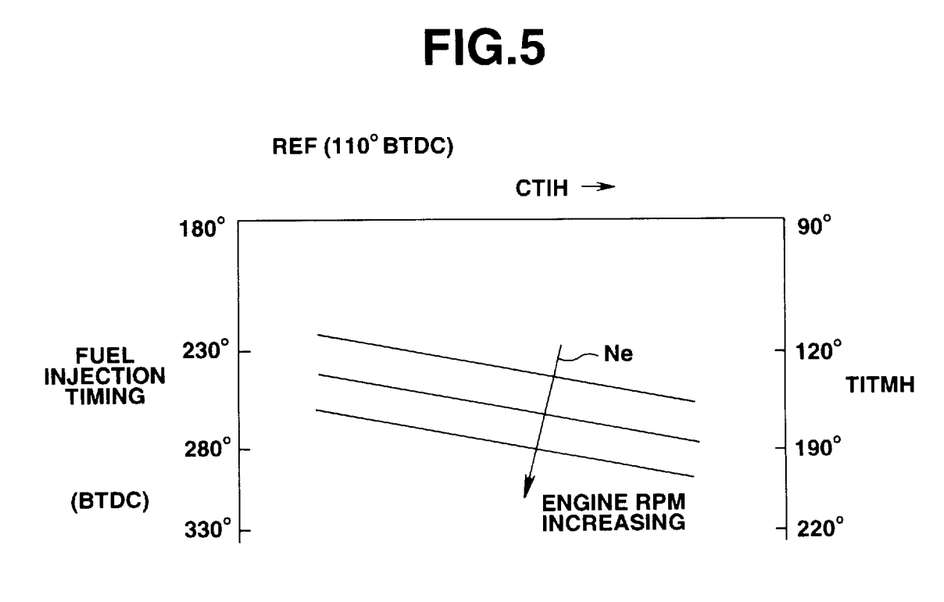
FIG. 5 is a view showing a map used for determining the fuel injection timing for the homogeneous combustion mode.

At a step 70, the controller 32 determines a homogeneous mode fuel injection timing TITMH in the form of a crank angle (or angular distance) from the above-mentioned reference signal REF, by retrieval from a map having the fuel injection quantity CTIH and the engine speed Ne as parameters. FIG. 5 shows, as an example, a map the controller 32 can use for determining TITMH.

At a step 72, the controller 32 sets the number INJOFH of signals REF to be counted from the above-mentioned reference signal REF to the fuel injection timing, in a REFH counter.

At a step 74, the controller 32 sets a crank angle ANGTMH from the last signal REF to be counted by the above-mentioned REF counter, to the homogeneous mode fuel injection timing, in a POSH counter for counting unit crank angles (1 degree, for example).

Figure 6:
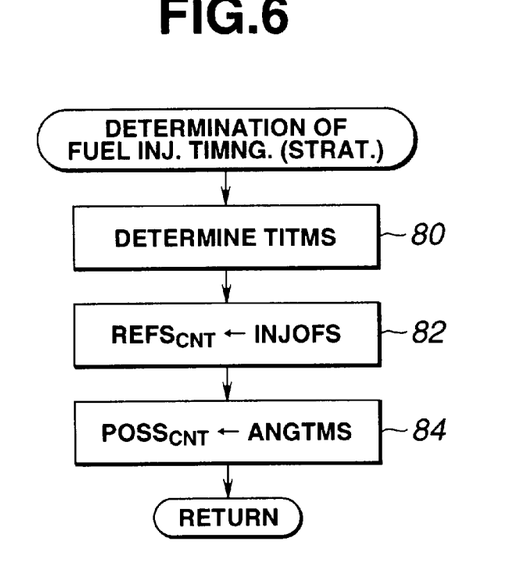
FIG. 6 is a flowchart showing a sub routine for the control system of FIG. 1, to set the fuel injection timing for the stratified combustion mode.

FIG. 6 shows a control flow of subroutine (of the step 62) for setting the fuel injection timing for the stratified combustion mode.

Figure 7:
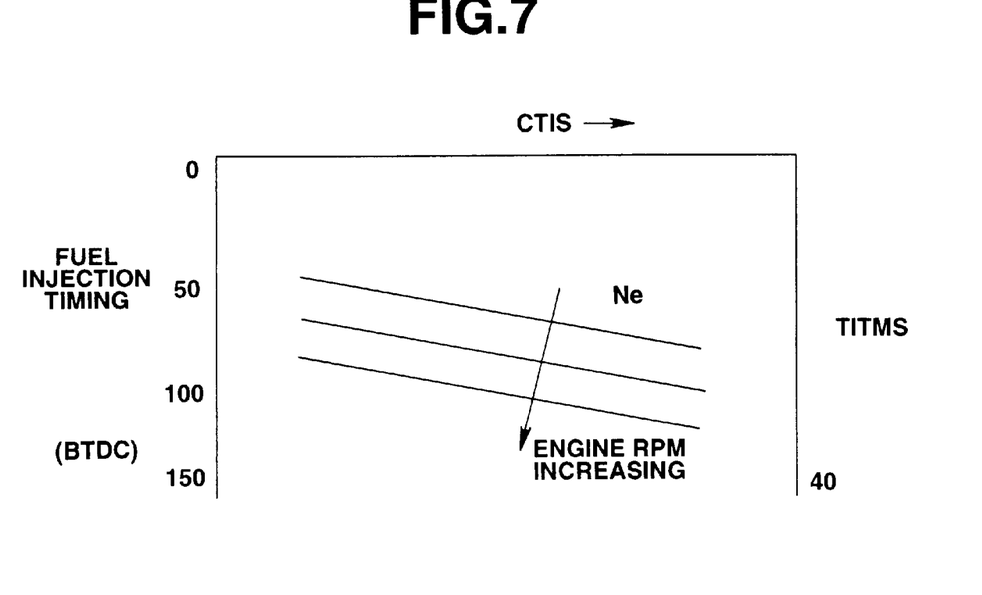
FIG. 7 is a view showing a map used for determining the fuel injection timing for the stratified combustion mode.

At a step 80, the controller 32 determines a stratified mode fuel injection timing TITMS in the form of a crank angle (or angular distance) from the above-mentioned reference signal REF, by retrieval from a map having the fuel injection quantity CTIH and the engine speed Ne as parameters. FIG. 7 shows, as an example, a map the controller 32 can use for determining TITMS.

At a step 82, the controller 32 sets the number INJOFS of signals REF to be counted from the above-mentioned reference signal REF to the fuel injection timing, in a REFS counter.

At a step 84, the controller 32 sets a crank angle ANGTMS from the last signal REF to be counted by the above-mentioned REF counter, to the stratified mode fuel injection timing, in a POSS counter for counting unit crank angles.

Figure 8:
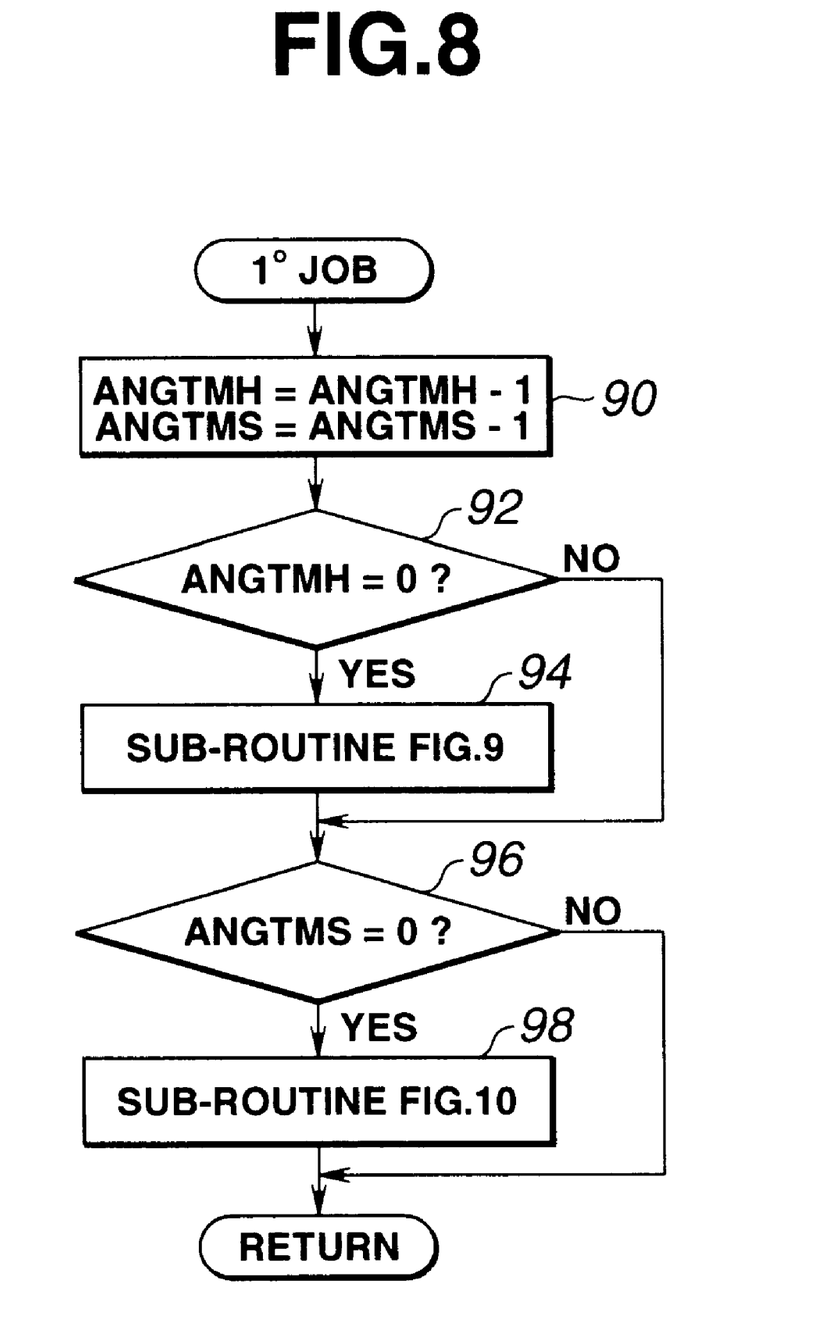
FIG. 8 is a flowchart showing a main routine for the control system of FIG. 1, to measure the fuel injection timings for the homogeneous combustion mode and the stratified combustion mode.

FIG. 8 shows a control flow for measuring the fuel injection start timing for each combustion mode. This control flow is carried out at regular intervals of a unit crank angle (every 1 degree).

At a step 90, the controller decrements each of the crank angle ANGTMH in the POSH counter, and the crank angle ANGTMS in the POSS counter.

At a step 92, the controller 32 determines whether the crank angle ANGTMH becomes equal to zero.

Figure 9:
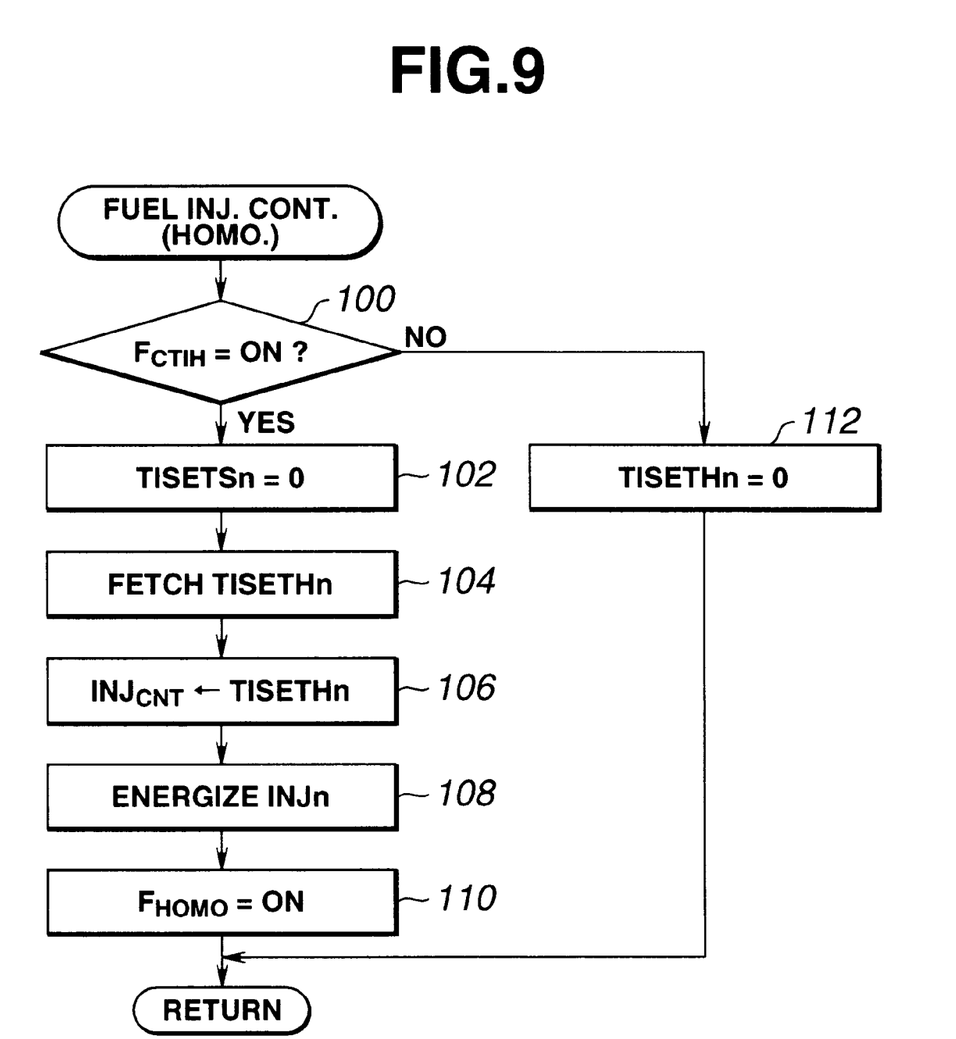
FIG. 9 is a flowchart showing a fuel injection control of the homogeneous combustion mode, performed by the control system of FIG. 1.

When the crank angle ANGTMH is equal to zero, then the controller 32 proceeds from the step 92 to a step 94 and carries out a homogeneous mode fuel injection control at the step 92 (as shown in FIG. 9).

When the crank angle ANGTMH is not equal to zero, then the controller 32 proceeds from the step 92 to a step 96, and determines whether the crank angle ANGTMS becomes equal to zero.

Figure 10:
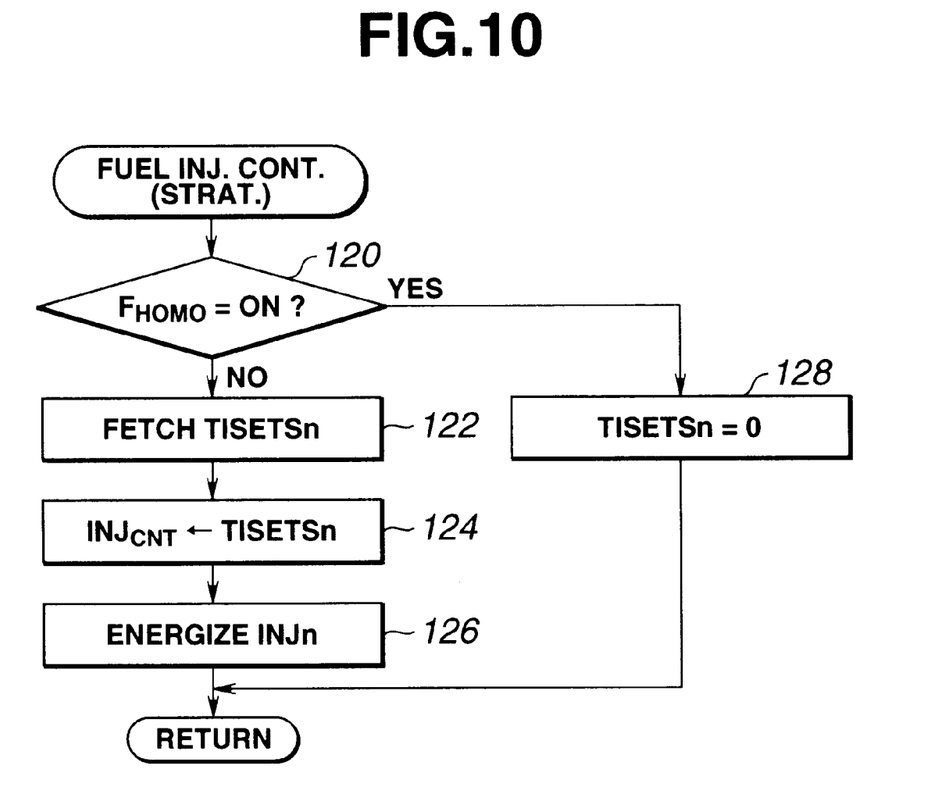
FIG. 10 is a flowchart showing a fuel injection control of the stratified combustion mode, performed by the control system of FIG. 1.

When the crank angle ANGTMS is equal to zero, the controller 32 proceeds from the step 96 to a step 98 and carries out a stratified mode fuel injection control at the step 98 (as shown in FIG. 10).

FIG. 9 shows the flow of the homogeneous mode fuel injection control of the step 94.

At a step 100, the controller 32 determines whether the calculation of the homogeneous mode fuel injection quantity CITH is complete or not, by checking the above-mentioned CITH calculation end flag FCTIH.

When the calculation of the homogeneous mode fuel injection quantity CITH is finished, and hence the flag FCTIH is in the set state, the controller 32 proceeds from the step 100 to a step 102. At the step 102, the controller 32 stops the stratified combustion by resetting the stratified mode fuel injection quantity TISETSn for the corresponding cylinder n, to zero.

Then, at a step 104, the controller 32 reads the homogeneous mode fuel injection quantity TISETHn.

At a step 106, the controller 32 stores the homogeneous mode fuel injection quantity TISETHn (representing the pulse width) in a counter INJCNT for measuring an on time of the fuel injector (valve).

At a step 108, the control system starts energizing the fuel injector for the corresponding cylinder n. Therefore, the injector injects the fuel in the quantity corresponding to TISETHn into the cylinder n. Thus, the control system carries out the homogeneous combustion.

At a step 110, the controller 32 sets a homogeneous mode injection execution flag FHOMO (second condition signal) to indicate that the homogeneous mode fuel injection has been carried out by energizing the corresponding injector during the time stored in the counter INJCNT.

When the calculation of the homogeneous mode fuel injection quantity CITH is not yet finished (that is, the calculation is not yet started, or the calculation is still in progress), the controller 32 proceeds from the step 100 to a step 112, and resets the homogeneous mode fuel injection quantity TISETHn for the cylinder n to zero at the step 112. Thus, the control system suspends the changeover from the stratified mode to the homogeneous mode to each of the engine cylinders if the homogeneous mode fuel injecting timing for that cylinder is reached before the completion of the calculation of the homogeneous mode fuel injection quantity for that cylinder. In the case of changeover from the homogeneous mode to the stratified mode, the control system performs the same operations for judgement as mentioned before. In this case, therefore, the control system changes over the combustion to the stratified mode immediately without continuing the homogeneous mode.

FIG. 10 shows the flow of the stratified mode fuel injection control of the step 98.

At a step 120, the controller 32 determines whether the homogeneous mode fuel injection has been executed or not, by checking the above-mentioned homogeneous mode injection execution flag FHOMO.

When the homogeneous mode fuel injection is already carried out, and hence the execution flag FHOMO is in the set state, the controller 32 proceeds from the step 120 to a step 128. At the step 128, the controller 32 resets the stratified mode fuel injection quantity TISETSn for the corresponding cylinder n, to zero, and thereby prevents the stratified mode fuel injection. In this way, the control system can prevent undesired enrichment of the air fuel mixture due to double fuel injection.

When the homogeneous mode fuel injection is not carried out, and hence the execution flag FHOMO remains in the reset state, the controller 32 proceeds from the step 120 to a step 122 and reads the stratified mode fuel injection quantity TISETSn for the corresponding cylinder n. In this case, the stratified mode fuel injection quantity TISETSn is not reset to zero at the step 102, and instead remains at the already-calculated value.

Then, at a step 124, the controller 32 stores the stratified mode fuel injection quantity TISETSn (representing the pulse width) in the counter for measuring the on time of the fuel injector.

At a step 126, the control system starts energizing the fuel injector for the corresponding cylinder n. Therefore, the injector injects the fuel in the quantity corresponding to TISETSn into the cylinder n. Thus, the control system carries out the stratified combustion.

Figure 11:
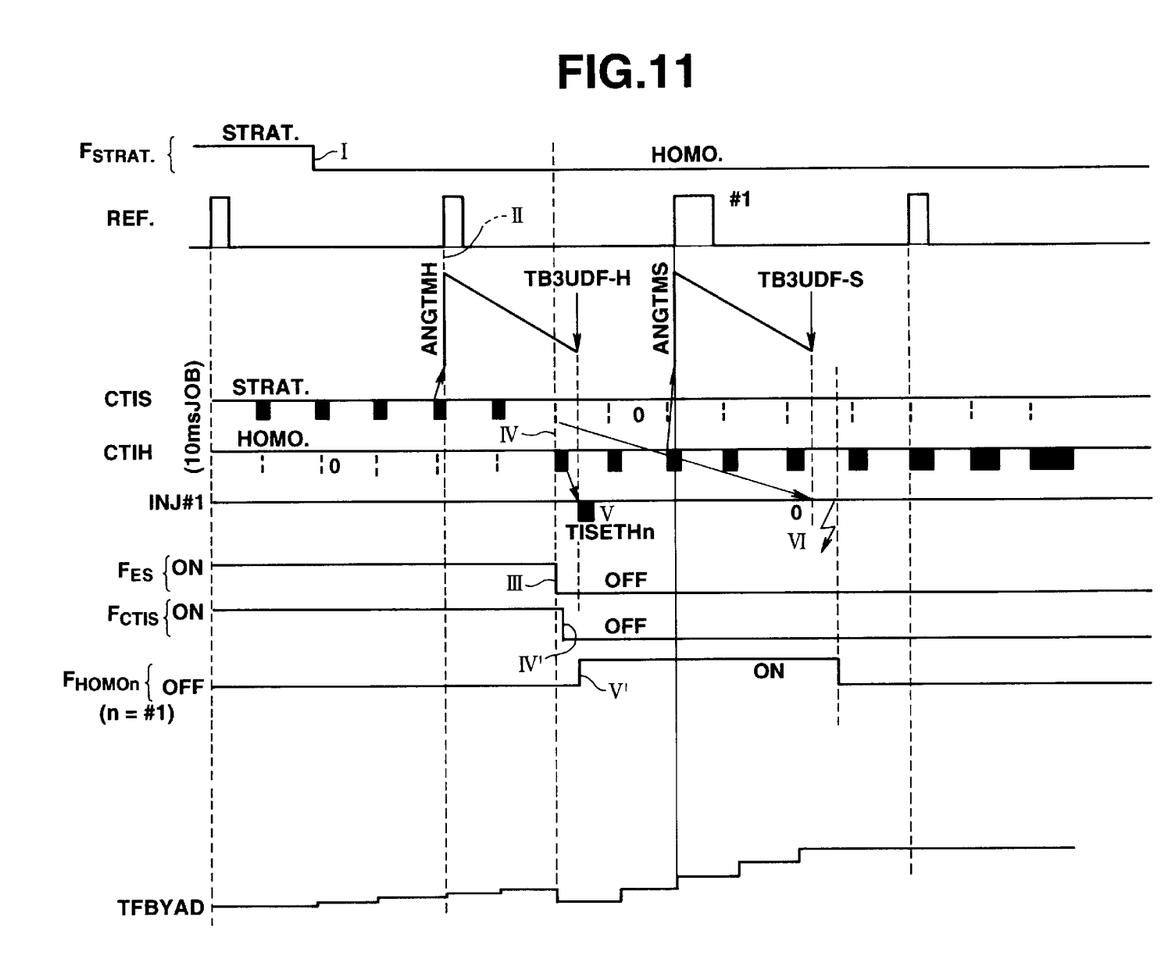
FIG. 11 is a time chart showing a sequence of events occurring in the control system of FIG. 1 in transition from the stratified combustion mode to the homogeneous combustion mode.
Figure 12:
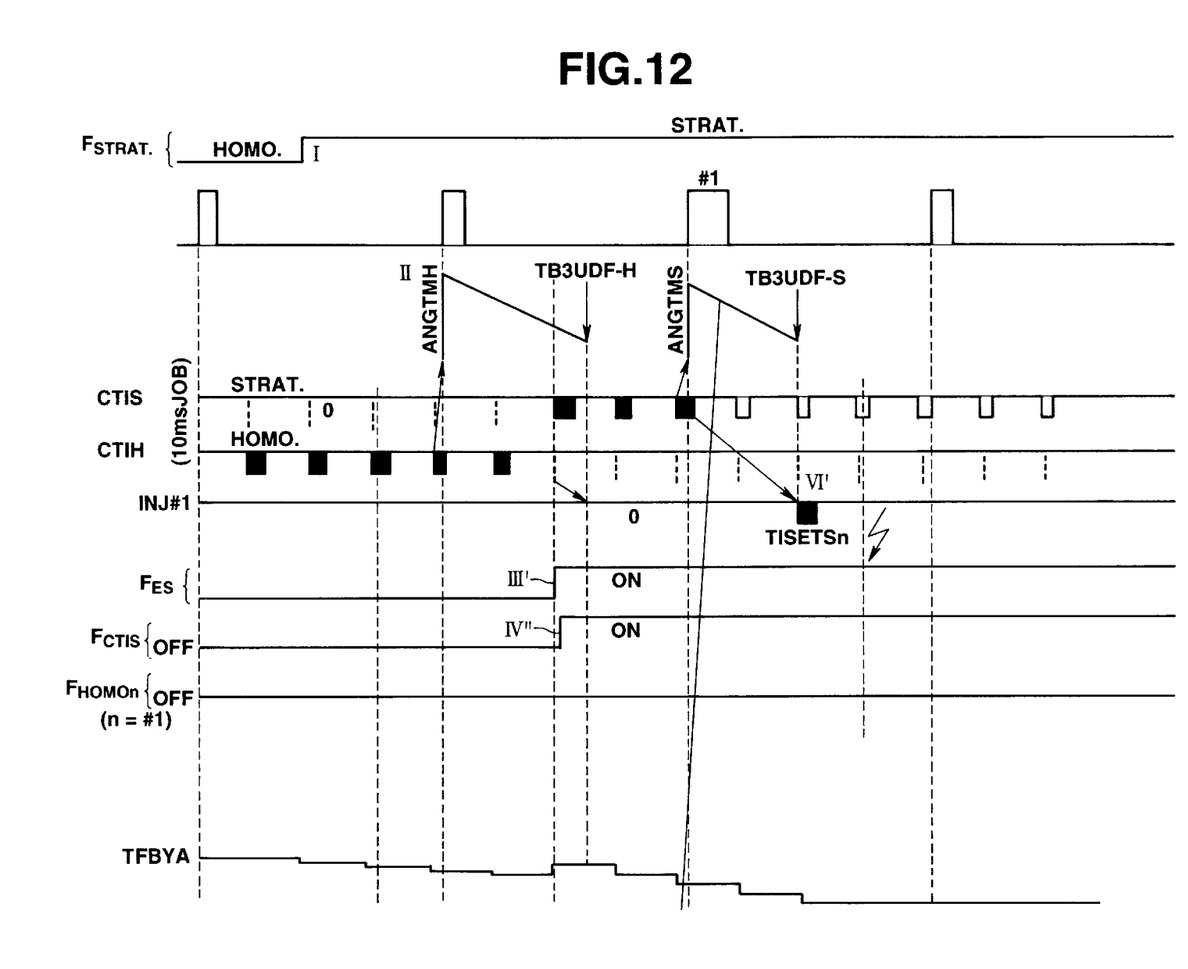
FIG. 12 is a time chart showing a sequence of events occurring in the control system of FIG. 1 in transition from the homogeneous combustion mode to the stratified combustion mode.

FIGS. 11 and 12 are time charts for illustrating operations of this control system.

FIG. 11 shows behavior in the case of changeover from the stratified combustion to the homogeneous combustion.

At a time point I shown in FIG. 11, the desired combustion mode (represented by a condition signal FSTRAT.) is changed from the stratified mode to the homogeneous mode in response to a change in the engine operating condition. Thereafter, the control system starts the count for determining the homogeneous mode injection timing at a point II when the controller 32 receives a first signal REF for the first time after the change of the desired combustion mode to the homogeneous mode. Thus, the control system prepares for the changeover of combustion. During this, the phase delay corrected target equivalent ratio TFBYAD is varied gradually. When this ratio TFBYAD enters a predetermined region required to enable such a smooth changeover as to keep the engine torque substantially constant, the controller 32 changes a condition signal FES to an OFF state at a point III and thereby selects the homogeneous mode as the desired target combustion mode. In response to this change of the condition signal FES, the controller 32 starts calculating the homogeneous mode fuel injection quantity TISETHn at a point IV by using most recent values of the engine operating conditions. A stratified mode fuel injection quantity calculation end flag FCTIS is reset at IV'.

After the end of the calculation of the homogeneous fuel injection quantity TISETHn, the control system starts the homogeneous mode fuel injection to the cylinder (the number one cylinder in the example of FIG. 11) for which the homogeneous mode injection timing comes first, and thus changes the combustion mode of this cylinder at V. After setting the homogeneous mode injection execution flag FHOMO for the number one cylinder at V', the control system stops the stratified mode injection by setting TISETSn to zero at VI, and thereby prevents double injection.

For the cylinder still unprepared for the homogeneous combustion mode at its time of the homogeneous injection timing, the control system carries out the fuel injection at the stratified mode injection timing by the stratified mode injection quantity calculated before the changeover. If the time for the homogeneous mode injection comes during the process of calculating the homogeneous mode injection quantity, the control system performs the stratified mode injection instead of the homogeneous mode injection. Thus, the control system can reliably prevent a miss of injection.

Thus, the control system starts the homogeneous mode fuel injection from the cylinder prepared for the homogeneous injection before the homogeneous injection timing, and accomplishes the homogeneous mode injection to the remaining cylinders sequentially, thereby to change the combustion mode of the cylinders one after another.

FIG. 12 shows behavior in the case of changeover from the homogeneous combustion to the stratified combustion.

In accordance with the phase delay corrected target equivalent ratio TFBYA, the selected target combustion mode is changed from the homogeneous mode to the stratified mode at III'. In response to this selection changeover, the control system sets the stratified mode fuel injection quantity calculation end flag at IV', and starts the stratified combustion at VI' from the cylinder for which the calculation of the stratified mode injection quantity TISETSn is finished. When the time for the homogeneous mode injection comes during the process of calculation of the stratified mode injection quantity, the control system takes the route of the homogeneous mode because of the control arrangement in which the homogeneous mode injection quantity calculation end flag is reset at the step 54 shown in FIG. 2. Thus, this control system prevent double injection and miss of injection.

Normally, there is sufficient time from the end of the calculation of the stratified mode injection quantity to the stratified mode injection timing. The calculation of the stratified mode injection quantity, even if started immediately after the homogeneous mode injection timing, comes to an end normally before the stratified mode injection timing. Therefore, it is optional to change the position of the step 54 before the step 50. In this case, the control system resets the homogeneous mode injection calculation end flag immediately upon receipt of the negative answer of the step 40 selecting the stratified mode. The control system starts the stratified mode injection if the stratified mode is selected before the homogeneous mode injecting timing, without regard to the process of calculation of the stratified mode injection quantity.

In the illustrated embodiment of the present invention, the control system performs the stratified mode injection if the time for the homogeneous injection has come during the process of calculation of the homogeneous mode injection quantity after a judgement of changeover from the stratified mode to the homogeneous mode. Alternatively, the control system may be arranged to wait until the end of calculation of the homogeneous mode injection quantity and to start the homogeneous mode injection. In this alternative embodiment, the control system retards a start of the homogeneous mode injection until an end of the calculation of the homogeneous mode injection quantity if, in a case of a changeover of the target combustion mode from the stratified combustion mode to the homogeneous combustion mode, the time for the homogeneous mode injection has come during progress of the calculation of the homogeneous mode injection quantity.

What is claimed is:

1. An engine control system comprising:
   an internal combustion engine comprising a fuel injection system for changing a fuel injection timing between a first injection timing to achieve homogeneous charge combustion and a second injection timing to achieve stratified charge combustion;
   a sensor for sensing an engine operating condition of the engine; and
   a controller for selecting, as a desired target combustion mode, one of homogenous combustion mode and stratified combustion mode in accordance with the engine operating condition, for calculating a first fuel injection quantity for the homogeneous mode if the homogeneous mode is selected, and a second fuel injection quantity for the stratified mode if the stratified mode is selected, for allowing a start of a homogeneous mode injection of fuel in the first injection quantity to a given cylinder of the engine at the first injection timing for the given cylinder if calculation of the first fuel injection quantity for the given cylinder is finished prior to the first injection timing for the given cylinder, and for performing a stratified mode injection of the fuel in the second injection quantity to the given cylinder at the second injection timing for the given cylinder if the calculation of the first fuel injection quantity for the given cylinder is not finished by the first injection timing for the given cylinder.

2. The engine control system according to claim 1 wherein the controller is configured to respond to a changeover of the target combustion mode from the stratified combustion mode to the homogeneous combustion mode, by allowing the homogeneous mode injection of fuel in the first injection quantity to the given cylinder of the engine at the first injection timing for the homogeneous mode if the calculation of the first fuel injection quantity for the given cylinder is finished prior to the first injection timing for the given cylinder, and for inhibiting the homogeneous mode injection and instead allowing the stratified mode injection of the fuel in the second injection quantity to the given cylinder at the second injection timing by use of a value of the second injection quantity calculated before the changeover of the target combustion mode if the calculation of the first fuel injection quantity for the given cylinder is not finished prior to the first injection timing for the given cylinder.

3. The engine control system according to claim 2 wherein the controller is configured to respond to a changeover of the target combustion mode from the homogeneous combustion mode to the stratified combustion mode, by performing the stratified mode injection of fuel in the second injection quantity to the given cylinder of the engine at the second injection timing for the stratified combustion mode if calculation of the second fuel injection quantity for the given cylinder is finished prior to the first injection timing for the given cylinder.

4. The engine control system according to claim 2 wherein the controller is configured to respond to a changeover of the target combustion mode from the homogeneous combustion mode to the stratified combustion mode, by allowing the stratified mode injection of fuel in the second injection quantity to the given cylinder of the engine at the second injection timing for the stratified combustion mode if the changeover of the target combustion mode from the homogeneous combustion mode to the stratified combustion mode is confirmed prior to the first injection timing for the given cylinder.

5. The engine control system according to claim 2 wherein the controller is configured to retard a start of the homogeneous mode injection until an end of the calculation of the first injection quantity if, in a case of a changeover of the target combustion mode from the stratified combustion mode to the homogeneous combustion mode, the first injection timing is reached during progress of the calculation of the first injection quantity.

6. The engine control system according to claim 2 wherein the controller is configured to select one of the homogeneous combustion mode and the stratified combustion mode by monitoring a first parameter representative of an engine load, determined in accordance with the engine operating condition, and a second parameter representative of a delayed target equivalent ratio which is delayed with respect to a desired target equivalent ratio determined in accordance with the engine operating condition.

7. The engine control system according to claim 2 wherein the controller is configured to calculate a first combustion efficiency in accordance with the engine operating condition and calculate the first injection quantity in accordance with the first combustion efficiency when the homogeneous combustion is selected, and the controller is further configured to calculate a second combustion efficiency in accordance with the engine operating condition and calculate the second injection quantity in accordance with the second combustion efficiency when the stratified combustion is selected.

8. The engine control system according to claim 7 wherein the controller is configured to vary each of the first and second injection timings in accordance with the engine operating condition.

9. The engine control system according to claim 1 wherein the engine controller is configured to produce a select signal which is in a homogeneous mode select state when the homogeneous mode is selected and in a stratified mode select state when the stratified mode is selected, to start the calculation of the first injection quantity when the select signal is changed from the stratified mode select state to the homogeneous mode select state, to set a first condition signal to a first signal state at an end of the calculation of the first injection quantity for the given cylinder, to enable the homogeneous mode injection of the first injection quantity for the given cylinder at the first injection timing when the first condition signal is in the first signal state, and to inhibit the homogeneous injection for the given cylinder at the first injection timing when the first condition signal is not in the first signal state.

10. The engine control system according to claim 9 wherein the controller is configured to reset the first condition signal to a second signal state when the select signal is changed from the homogeneous select state to the stratified select state, and disable the homogeneous mode injection and instead enable the stratified mode injection when the first condition signal is in the second signal state.

11. The engine control system according to claim 10 wherein the controller is configured to set a second condition signal to a first signal state at an end of the homogeneous mode injection, and to disable the stratified injection when the second condition signal is in the first signal state; wherein the controller is configured to reset the second injection quantity for the given cylinder to zero to disable the stratified mode injection when the first condition signal is in the first signal state, to reset the first injection quantity for the given cylinder to zero to disable the homogeneous mode injection when the first condition signal is in the second signal state, and to reset the second injection quantity for the given cylinder to zero to disable the stratified mode injection when the second condition signal is in the first signal state; wherein the controller is configured to carry out the stratified mode injection of the fuel in the second injection quantity to the given cylinder at the second injection timing for the given cylinder by the use of a most recent value of the second injection quantity calculated before the changeover of the target combustion mode if the first condition signal is in the second signal state and the second condition signal is not in the first signal state; and wherein the sensor comprises a first sensor for sensing a first engine operating condition indicative of an engine load, and a crank angle sensor for sensing a crank angle of the engine, and the controller performs the calculation of one of the first injection quantity and the second injection quantity periodically at regular intervals of a predetermined time length.

12. The engine control system according to claim 10 wherein the controller is configured to reset the first condition signal to the second signal state at an end of the calculation of the second injection quantity.

13. The engine control system according to claim 12 wherein the controller is configured to reset the first condition signal to the second signal state before a start of the calculation of the second injection quantity.

14. An engine control process for an internal combustion engine comprising a fuel injecting system for changing a fuel injection timing between a first injection timing to achieve homogeneous charge combustion and a second injection timing to achieve stratified charge combustion; the engine control process comprising:

a selecting step for sensing an engine operating condition of the engine and for selecting, as a desired target combustion mode, one of homogenous combustion mode and stratified combustion mode in accordance with the engine operating condition;

a calculating step for calculating a first fuel injection quantity for the homogeneous mode if the homogeneous mode is selected, and a second fuel injection quantity if the stratified mode is selected;

an injecting step for performing a homogeneous mode injection of fuel in the first injection quantity to a given cylinder of the engine at the first injection timing for the given cylinder if calculation of the first fuel injection quantity for the given cylinder is finished prior to the first injection timing for the given cylinder and for performing a stratified mode injection of the fuel in the second injection quantity to the given cylinder at the second injection timing for the given cylinder if the calculation of the first fuel injection quantity for the given cylinder is not finished prior to the first injection timing for the given cylinder.

15. The engine control process according to claim 14 wherein the selecting step comprises a step of producing a select signal which is in a homogeneous mode select state when the homogeneous mode is selected and in a stratified mode select state when the stratified mode is selected, the calculating step comprises a first step of starting the calculation of the first injection quantity when the select signal is changed from the stratified mode select state to the homogeneous mode select state, and a second step of setting a first condition signal to a first signal state at an end of the calculation of the first injection quantity for the given cylinder, and the injecting step comprises a condition discriminating step of enabling the homogeneous mode injection of the first injection quantity for the given cylinder at the first injection timing when the first condition signal is in the first signal state, and of inhibiting the homogeneous injection for the given cylinder at the first injection timing when the first condition signal is not in the first signal state.

16. The engine control process according to claim 15 wherein the calculating step comprises a step of resetting the first condition signal to a second signal state when the select signal is changed from the homogeneous select state to the stratified select state, and the injecting step comprises a step of disabling the homogeneous mode injection to instead enable the stratified mode injection when the first condition signal is in the second signal state.

17. The engine control process according to claim 16 wherein the injecting step comprises a step of setting a second condition signal to a first signal state at an end of the homogeneous mode injection, and a step of disabling the stratified mode injection when the second condition signal is in the first signal state; wherein the injecting step further comprises a step of resetting the second injection quantity for the given cylinder to zero to disable the stratified mode injection when the first condition signal is in the first signal state, a step of resetting the first injection quantity for the given cylinder to zero to disable the homogeneous mode injection when the first condition signal is in the second signal state, and a step of resetting the second injection quantity for the given cylinder to zero to disable the stratified mode injection when the second condition signal is in the first signal state; and wherein the injecting step comprises a step of carrying out the stratified mode injection of the fuel in the second injection quantity to the given cylinder at the second injection timing for the given cylinder by the use of a most recent value of the second injection quantity calculated before the changeover of the target combustion mode if the first condition signal is in the second signal state and the second condition signal is not in the first signal state.

18. The engine control process according to claim 17 wherein the selecting step and the calculating step are performed at regular intervals of a predetermined time length, and the injecting step is performed at regular intervals of a predetermined crank angle of the engine.

* * * * *